Figure 1:
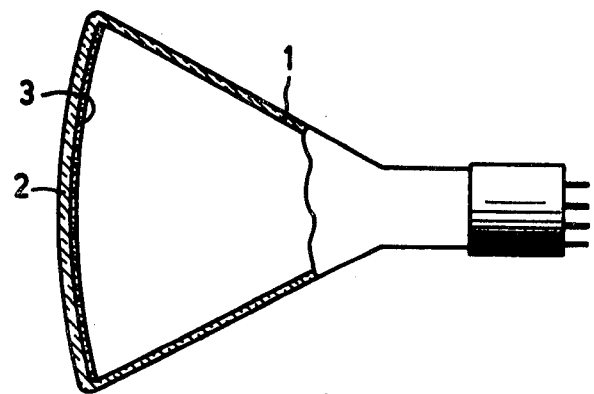

United States Patent

Schuil

[11] 3,943,400
[45] Mar. 9, 1976

[54] CATHODE-RAY TUBE PROVIDED WITH A LUMINESCENT SILICATE

[75] Inventor: Roelof Egbert Schuil, Eindhoven, Netherlands

[73] Assignee: U.S. Philips Corporation, New York, N.Y.

[22] Filed: Aug. 30, 1974

[21] Appl. No.: 502,150

Related U.S. Application Data

[62] Division of Ser. No. 271,833, July 14, 1972, Pat. No. 3,855,143.

[30] Foreign Application Priority Data

July 24, 1971 Netherlands .................... 7110248

[52] U.S. Cl. .............................................. 313/468
[51] Int. Cl.$^2$ .................... C09K 11/46; H01J 29/20
[58] Field of Search .............. 252/301.4 F, 301.4 R; 313/468

[56] References Cited

UNITED STATES PATENTS

| | | | |
|---|---|---|---|
| 3,564,322 | 2/1971 | Blasse et al. | 252/301.4 R X |
| 3,715,611 | 2/1973 | De Mesquita et al. | 252/301.4 F X |

OTHER PUBLICATIONS

Bomdar, et al., "Izvesta Akad. Nauk-SSSR," Vol. 33, No. 6, pp. 1057–1061.

*Primary Examiner*—Jack Cooper
*Attorney, Agent, or Firm*—Frank R. Trifari; Norman N. Spain

[57] ABSTRACT

A cathode-ray tube particularly for flying spot scanners, provided with a luminescent silicate activated by cerium, defined by the formula $Li_{1-x}Na_xY_{1-p}Ce_pSiO_4$, in which $0 \leq x \leq 0.90$ and $0.0001 \leq p \leq 0.25$, which silicate has the olivine crystal structure.

3 Claims, 2 Drawing Figures

U.S. Patent   March 9, 1976   3,943,400

PHN 5693

CATHODE-RAY TUBE PROVIDED WITH A LUMINESCENT SILICATE

This is a division of application Ser. No. 217,833, filed July 14, 1972, now U.S. Pat. No. 3,855,143.

The invention relates to a cathode-ray tube provided with a luminescent screen which comprises a luminescent silicate activated by trivalent cerium. Furthermore the invention relates to a method of manufacturing such a luminescent silicate and to the luminescent silicate itself.

Cathode-ray tubes provided with a luminescent screen which emits radiation upon excitation by electrons generated in the tube are used for many purposes, for example, for displaying television images, for recording oscillograms and for flying spot scanners. Dependent on their use the luminescent materials to be used in the luminescent screens must have different properties, for example, as regards spectral energy distribution, decay time, saturation, etc. A property which is always desired is that the energy conversion of the incident electrons into radiation is effected with a high efficiency.

For some uses, for example, in flying spot scanner a very important factor is the decay time of the radiation of the luminescent material. (The decay time is to be understood to mean in this case and hereinafter the period during which the intensity of the radiation emitted by the luminescent material, after discontinuation of the electron bombardment, decreases to $1/e$ times the value of the intensity just before the electron bombardment is discontinued).

In flying spot scanners the luminescent screen exclusively serves as a light source. The electron beam with which the luminescent screen is excited moves in accordance with a given pattern, sometimes referred to as raster, across the luminescent screen in such apparatus. The electron beam is then not modulated. As a result a fast moving light spot of constant intensity is produced on the screen. The light of this moving light spot is projected onto a document to be displayed, for example, a lantern slide, a film or a security paper and is partly passed or reflected thereby. The passed or reflected light is received by a photo-electric cell in which it is converted into an electrical signal. This electrical signal may then be transmitted by known communication means to an apparatus in which an image of the document is formed.

During scanning in the flying spot scanner the requirement must be imposed that the radiation incident on the photo-electric cell is correlated as much as possible exclusively with the optical absorption at the area of the spot of the document which is to be displayed at that moment. This leads to the requirement that the decay time of the luminescent radiation relative to the period of the electron beam being present at a given area must not be long. If, as is common practice, the rate of scanning the luminescent screen is equal to the rate at which a normal television display screen is scanned, this leads to the requirement that the decay time must be shorter than approximately $10^{-7}$ sec.

A number of luminescent materials have been found which satisfy this requirement. One of these materials, which is frequently used, is the so-called gehlenite ($Ca_2Al_2SiO_7$) which is activated by trivalent cerium. The maximum emission of this material upon electron excitation is at approximately 410 nm and the energy conversion efficiency is approximately 5%.

A drawback of ghlenite is that, although the decay time is sufficiently short, a considerable quantity of radiation is emitted during a relatively long period after the instant which the intensity has reached the value of $1/e$ times the maximum intensity. This so-called persistence is still clearly noticeable sometimes after 0.1 second and causes a disturbing electrical signal in the photo-electric cell. A number of silicates activated by trivalent cerium are described in Netherlands Patent Application No. 6811326 which persist to a very slight extent only. These silicates are defined by the formula $Y_{2(1-q)}Ce_{2q}Si_pO_{(3+2p)}$, in which $p$ has the value of 1 or 2, and in which $2.10^{-4} \leq q \leq 2.10^{-1}$. Particularly the silicates with $p=1$ are suitable for flying spot scanners as a result of their favourable spectral distribution of the emission (maximum at 400–430 nm) and their high conversion efficiency (approximately 6%). The silicates proposed in the above-mentioned Netherlands Patent Application can generally be manufactured with difficulty because the formation of these silicates through diffusion reactions between solid materials must be effected at a high temperature. The use of so-called melting salts in this method often gives rise to an unwanted increase of the persistence period of the luminescent silicate.

The object of the invention is to provide a luminescent silicate activated by trivalent cerium which upon electron excitation has a short decay time and substantially does not persist and whose manufacture does not cause special difficulties.

According to the invention a cathode-ray tube is provided with a luminescent screen which comprises a luminescent silicate activated by trivalent cerium and is characterized in that the silicate is defined by the formula $Li_{1-x}Na_xY_{1-p}Ce_pSiO_4$, in which $0 \leq x \leq 0.90$ and $0.0001 \leq p \leq 0.25$, and that the silicate has the olivine crystal structure.

According to the invention a cathode-ray tube comprises a cerium-activated silicate of lithium and of yttrium in which up to a maximum of 90 mol % of lithium may be replaced by sodium. The silicate of lithium and yttrium ($LiYSiO_4$) may occur in two crystal structures, namely the olivine structure which is stable at low temperatures and the $\beta$-calcium silicate structure which is stable at high temperatures. The transition temperature between these two structures is approximately 1080° C. It has been found that a large part of lithium in $LiYSiO_4$ having the olivine structure may be replaced by sodium (namely to approximately 90 mol.%) while the olivine structure is maintained. The pure $NaYSiO_4$, however, has a different crystal structure.

Experiments which have led to the invention have shown that $LiYSiO_4$ having the olivine structure constitutes a very efficient luminescent material upon activation by cerium. Upon electron excitation brightnesses are achieved with this material which are approximately 150% of that of the above-mentioned known gehlenite. The decay time of the luminescence is very short and is of the same order as that of gehlenite (shorter than 100 n sec.). It is found that the luminescent silicate according to the invention as well as the silicates known from the said Netherlands Patent Application No. 6811326 do not show substantially any persistence. The spectral distribution of the emitted radiation of cerium-activated lithium yttrium silicate according to the invention consists of a comparatively broad band having a maximum at approximately 405 nm.

When partly replacing lithium by sodium in a luminescent silicate according to the invention the luminescent properties of the silicates slightly change. The maximum of the spectral distribution of the emitted radiation shifts with increasing sodium content to larger wavelengths to approximately 430 nm for the compound $Li_{0.1}Na_{0.9}YSiO_4$-Ce. The decay time and the persistence period remain short. The brightness upon excitation by electrons slightly decreases with increasing sodium content and is found to be of the same order for higher value of $x$ as that of the known gehlenite. A great advantage of the sodium-containing luminescent silicates according to the invention is that they have a very constant brightness when used in cathode-ray tubes during the lifetime of these tubes. Likewise as the known gehlenite, $LiYSiO_4$ according to the invention which does not contain sodium is found to lose approximately 20 to 25% of the initial brightness after an operation period of 1000 hours in a cathode-ray tube. On the other hand a silicate according to the invention in which, for example, 80 mol% of lithium is replaced by sodium has a decline in brightness of approximately 1-2% after 1000 hours. Therefore cathode-ray tubes according to the invention are preferred which comprise a silicate defined by the above-given general formula which $x$ has a value of between 0.50 and 0.80.

In the luminescent silicates according to the invention a small portion of yttrium may be replaced by one or more of the rare earth metals, for example, gadolinium or lanthanum. The luminescent properties of the silicate substantially do not change if the olivine crystal structure is maintained. Such a replacement does not, however, yield extra advantages.

Experiments have proved that in case of partial replacement of lithium by potassium in cerium-activated lithium yttrium silicate a luminescent material is produced which in addition to the blue emission exhibits an intensive green emission upon electron excitation. However, the green emission of this material which does not have the olivine structure disappears gradually during operation in a cathode-ray tube. The decline in brightness of this material during operation is very large so that this material is not very suitable for practical uses.

It is to be noted that cerium-activated sodium yttrium silicate which, as stated above, does not have the olivine structure has a brightness upon electron excitation which is only approximately 15% of that of lithium yttrium silicate according to the invention. Consequently, this material is not very suitable for practical uses. This likewise applies to cerium-activated lithium yttrium silicate having the β-calcium silicate structure whose brightness upon electron excitation is only a faction of the brightness of cerium-activated lithium yttrium silicate having the olivine structure.

The cerium content which is denoted by $p$ in the general formula for the luminescent silicates according to the invention is to be chosen within the above-mentioned range. For values of $p$ of less than 0.0001 or more than 0.25 materials having too little brightness are obtained. The maximum brightnesses are achieved for values of $p$ between the relatively wide limits of 0.002 and 0.10. In this range, which is preferred, the brightness is found to be only little dependent on the chosen value of $p$.

As a result of the favourable spectral distribution of the emitted radiation and of the short decay time and persistence period the silicates according to the invention are particularly suitable for use in flying spot scanners. In many cases, particularly for use in flying spot scanners for generating colour television signals, the emission of the luminescent screen of a cathode-ray tube according to the invention is to be increased in the green and red parts of the spectrum by incorporating a further luminescent material in the screen the emission of which luminescent material lies in the said part of the spectrum. Such a material may be mixed, for example, with the silicate according to the invention, but may alternatively be provided in a separate layer on the screen. Of course, such a material must also have a short decay time, namely shorter than $10^{-7}$ sec. Cerium-activated yttrium aluminate having the garnet structure known from the Netherlands Patent Application No. 6706095 corresponding to U.S. Pat. No. 3,564,322 the disclosure of which is incorporated by reference may be advantageously used for this second material.

A further advantageous use of the luminescent silicates according to the invention is found in oscilloscopes for recording very fast phenomena.

A great advantage of the silicates according to the invention is that they can be readily manufactured at comparatively low temperatures. For this manufacture a method is preferably used in which a mixture is made of oxides of the metals stated in the general formula or of compounds which can produce these oxides together with a quantity of silicon dioxide. This mixture is then heated in air for 0.5 to 5 hours at a temperature of between 600° and 1200° C. After cooling and homogenising of the product thus obtained it is subjected to a second heat treatment in a reducing atmosphere at a temperature below the transition temperature between the olivine crystal structure of the β-calcium silicate crystal structure. This transition temperature is approximately 1080° C.

Due to the presence of lithium oxide and/or a lithium salt in a molten condition in the firing mixture one is not exclusively dependent on a diffusion of solid materials for the manufacture of the silicates according to the invention. Consequently the formation reaction proceeds faster and better than is the case for manufacturing the said known silicates. It has been found that it is generally advantageous to start from a firing mixture which comprises the composite components in quantities corresponding to the stoichiometry of the desired compound. However, lithium is to be used in a small excess. It is preferred to use yttrium in the firing mixture in quantities which are not smaller than is stoichiometrically required, because a deficiency of yttrium promotes the formation of the β-calcium silicate structure. The firing temperature at the second heat treatment is preferably chosen to be as high as possible, because then luminescent silicates having the maximum brightnesses are obtained as will be proved hereinafter. At this second heat treatment the temperature must, however, not exceed the said transition temperature.

If necessary, the luminescent silicate obtained by the method described above may be ground until a desired mean grain size is obtained. The luminescent silicates according to the invention are found to have the advantage that such a grinding operation has only a very slight influence on the brightness of these materials. This is in contrast with many known luminescent materials which exhibit a strong decrease in brightness as a result of a grinding operation.

The invention will now be further described with reference to some examples, number of measurements and a drawing.

FIG. 1 of the drawing diagrammatically shows a cathode-ray tube according to the invention.

Figure 2:
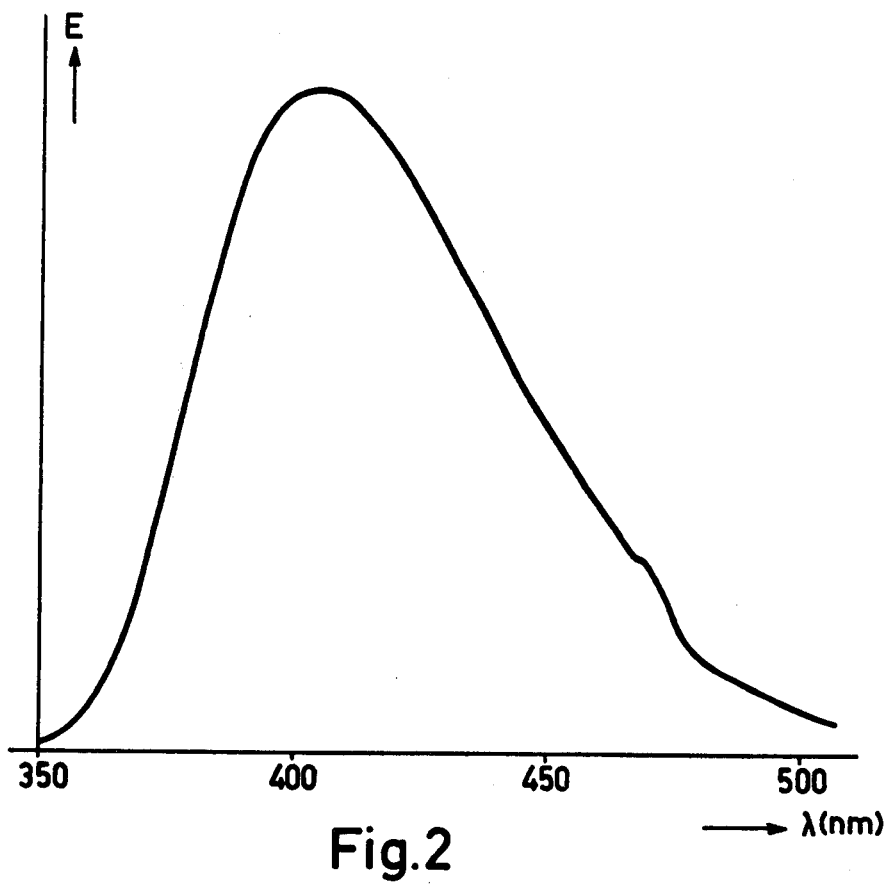

FIG. 2 of the drawing shows in a graph the spectral energy distribution of the emitted radiation of the luminescent silicate according to the invention upon electron excitation.

EXAMPLES

I. A mixture is made of
2.458 g $SiO_2$ (contains 2.34 % by weight of $H_2O$)
4.628 g $Y_{1.98}Ce_{0.02}O_3$
0.084 g LiCl
1.476 g $Li_2CO_3$ This mixture is heated in air for 2 hours in a furnace at a temperature of 1100° C. After cooling the product obtained is ground and subjected to a second heat treatment for 2 hours in a reducing carbon monoxide-containing atmosphere at a temperature of 1070° C. The reducing atmosphere is obtained by placing a quantity of carbon in the vicinity of the firing mixture in the furnace. After cooling and, if necessary, light grinding and sieving the product is ready for use in a cathode-ray tube according to the invention. The luminescent silicate obtained is defined by the formula $LiY_{0.99}Ce_{0.01}SiO_4$. It has been shown with the aid of X-ray diffraction analysis that the silicate has the olivine crystal structure. Upon electron excitation in a cathode-ray tube this silicate has a brightness which is approximately 150% of that of the known gehlenite. The spectral distribution of the emitted radiation of the silicate has a maximum at 405 nm. The silicate has a decay time of 70 nsec and does not show substantially any persistence. Upon electron bombardment under standard circumstances in a cathode-ray tube which can be disassembled the silicate manufactured in accordance with this example is found to have a decline in brightness of 13%. The decline in brightness of the known gehlenite under these circumstances is substantially equally large.

II. Operations are carried out in the same manner as described in example I in which, however, the said quantity of $Li_2CO_3$ is replaced by 0.591 g $Li_2CO_3$ and 1.272 g $Na_2CO_3$. A silicate defined by the formula $Li_{0.4}Na_{0.6}Y_{0.99}Ce_{0.01}SiO_4$ having the olivine crystal structure is obtained. The brightness of this silicate is found to be of the same order as that of the known gehlenite. The silicate has a decay time of 80 nsec. and does not show substantially any persistence. The decline in brightness under standard conditions in a cathode-ray tube which can be disassembled is found to be only 2%.

III. In the same manner as described in example I a luminescent silicate is obtained which is defined by the formula $Li_{0.2}Na_{0.8}Y_{0.99}Ce_{0.01}SiO_4$ which has the olivine structure. The quantity of $Li_2CO_3$ mentioned in example I is replaced by 0.296 g $Li_2CO_3$ and 1.696 g $Na_2CO_3$. The brightness of this silicate is substantially the same as that of the known gehlenite. The silicate has a decay time of 100 nsec and shows substantially no persistence. The maximum of the spectral distribution of the emitted radiation is located at approximately 430 nm. The decline in brightness under standard conditions in a tube which can be disassembled is found to be substantially 0%.

IV. To check the influence of the cerium content a number of silicates is manufactured in a manner completely analogous to example I in which, however, p has the values of 0.005, 0.01, 0.02 and 0.04. All these materials are found to have substantially the same brightness, namely approximately 150% of the brightness of the known gehlenite. Also the location of the maximum of the spectral distribution is found to be the same for these materials, namely 405 nm.

V. The influence of the firing temperature at the second (reducing) heat treatment on brightness is checked by repeating the method of example I several times in which, however, different values of the firing temperature T at the second heat treatment are used. The table below gives the relative brightness H (in arbitrary units) of the silicate obtained for each value of T. It is clearly shown that the maximum brightnesses are achieved at temperatures near the transition temperature between the olivine and the $\beta$-calcium silicate structure. If the firing temperature T exceeds this transition temperature, lower brightnesses are obtained.

| T in °C | H |
| --- | --- |
| 1000 | 113 |
| 1020 | 123 |
| 1050 | 143 |
| 1070 | 171 |
| 1085 | 150 |
| 1100 | 148 |

In FIG. 1 of the drawing 1 denotes the wall of the cathode-ray tube. 2 denotes the face plate which is coated on its inner side with a luminescent layer 3 which comprises a luminescent silicate according to the invention.

In FIG. 2 of the drawing a graph is shown in which the wavelength $\lambda$ is plotted in nm on the abscissa and the radiated energy E is plotted in arbitrary units on the ordinate. The curve shows the spectral energy distribution of the silicate according to example I upon electron excitation.

What is claimed is:

1. A cathode ray tube for flying spot scanners, said cathode-ray tube being provided with a faceplate coated with a luminescent layer comprising a luminescent silicate having the olivine crystal structure, said silicate being activated by trivalent cerium and having the formula $Li_{1-x}Na_xY_{1-p}Ce_pSiO_4$ wherein $0.50 < x < 0.80$ and $0.0001 \leq p \leq 0.25$ and means to produce an electron beam to excite said silicate to luminescence.

2. The cathode-ray tube of claim 1 wherein $0.002 \leq p \leq 0.10$.

3. The cathode-ray tube of claim 1 wherein the luminescent layer comprises in addition a yttrium aluminate activated by trivalent cerium, having the garnet structure, an emission in the green and red parts of the spectrum and a decay time of less than $10^{-7}$ sec.

* * * * *